United States Patent [19]
Rawson et al.

[11] 3,734,082
[45] May 22, 1973

[54] SIGNAL PROCESSING SYSTEM FOR ACHILLES TENDON REFLEX TESTING

[75] Inventors: Edward B. Rawson, Lincoln; David J. O'Riorden, Jr., Billerica, both of Mass.

[73] Assignee: Searle Medidata, Inc., Waltham, Mass.

[22] Filed: Mar. 24, 1971

[21] Appl. No.: 127,555

[52] U.S. Cl. .................. 128/2 N, 307/232, 307/251, 328/110, 328/150
[51] Int. Cl. ............................................. A61b 5/16
[58] Field of Search ..................... 128/2 N, 2 S, 2 R, 128/2.06 A, 2.06 R, 2.1 B; 324/77 R; 328/150, 110; 307/232, 251

[56] References Cited

UNITED STATES PATENTS

| | | | |
|---|---|---|---|
| 3,598,110 | 8/1971 | Edmark | 128/2.06 A |
| 3,267,933 | 8/1966 | Mills et al. | 128/2.06 A |
| 3,322,115 | 5/1967 | Richards | 128/2 N |
| 3,200,814 | 8/1965 | Taylor et al. | 128/2 N |
| 3,123,768 | 3/1964 | Burch et al. | 128/2.1 B |

OTHER PUBLICATIONS

IEEE Transactions on Bio-Med. Engineering, Oct. 1971, pp. 353-355.
The New England Journ. Of Med., May 14, 1959, pp. 1027-1028.
The New England Journ. of Med., Oct. 16, 1958, pp. 761-764.

*Primary Examiner*—Kyle L. Howell
*Attorney*—Weingarten, Maxham & Schurgin

[57] ABSTRACT

A signal processing system for Achilles tendon reflex testing operative to determine the elapsed time between a hammer tap and the one half relaxation point for both normal and abnormal Achilles tendon reflexes. The test operator is provided with a visual indication of foot motion which is marked to indicate the points of tap initiation and one half relaxation. A digital count is provided corresponding to each one half relaxation time and means are provided to enable entry of this data into a data processor by the test operator when a proper Achilles response has been noted.

14 Claims, 12 Drawing Figures

3,734,082
SHEET 1 OF 2
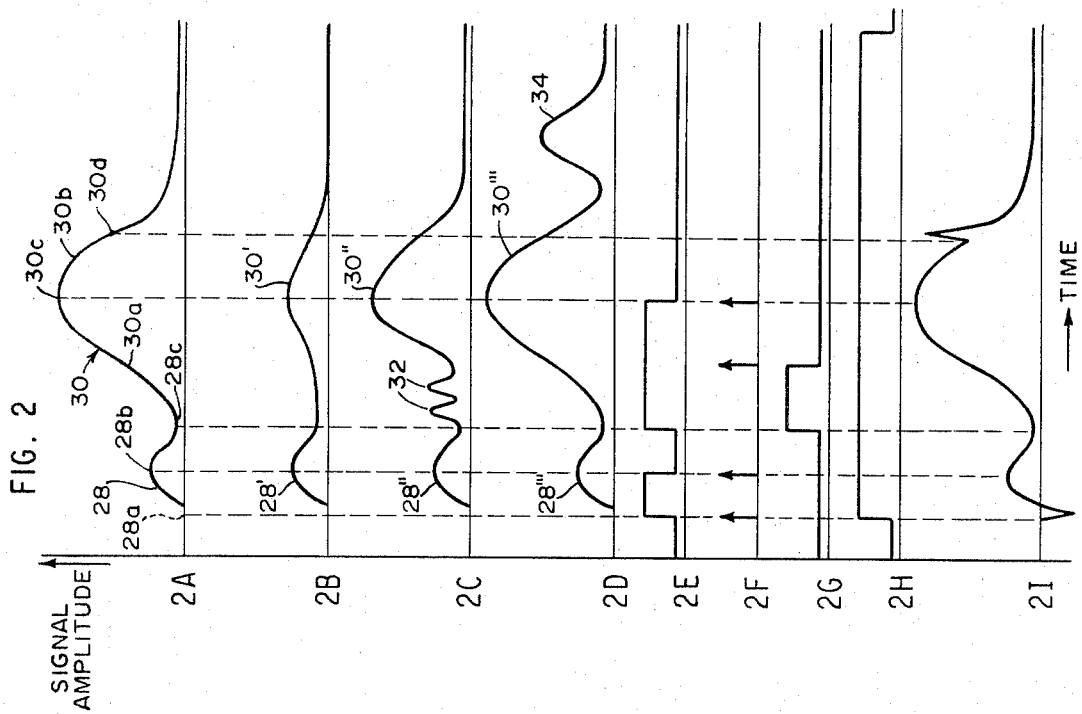
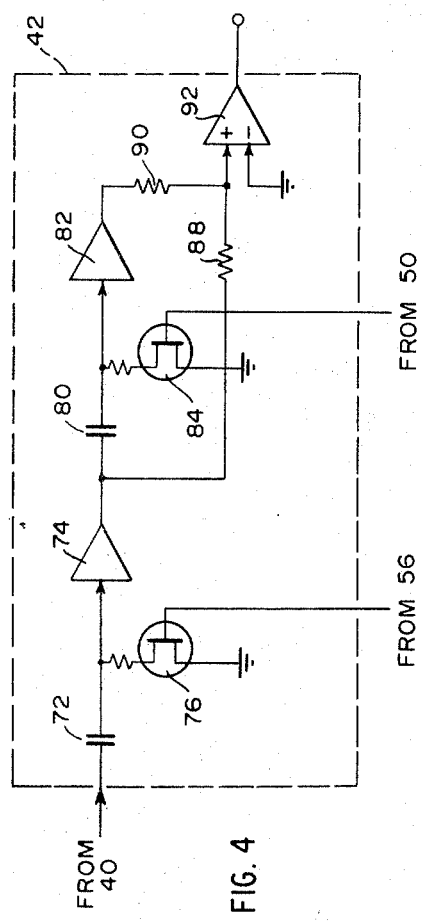
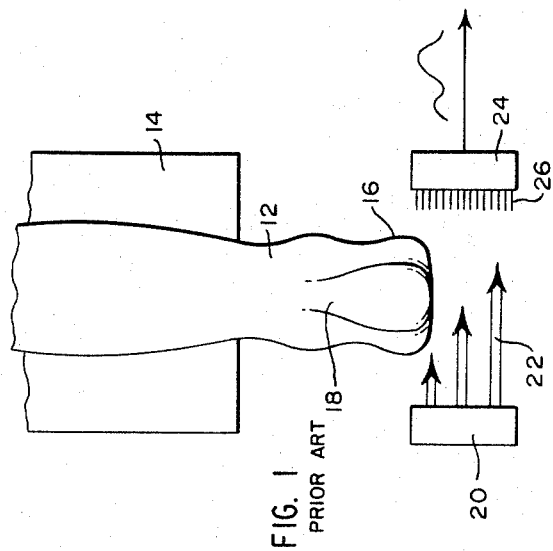
INVENTORS
EDWARD B. RAWSON
DAVID J. O'RIORDEN, JR.
BY
*Weingarten, Maxham & Schurgin*
ATTORNEYS INVENTORS
EDWARD B. RAWSON
DAVID J. O'RIORDEN, JR.
BY
Weingarten, Maxham & Schurgin
ATTORNEYS 3,734,082

SIGNAL PROCESSING SYSTEM FOR ACHILLES TENDON REFLEX TESTING

FIELD OF THE INVENTION

This invention relates to systems for timing the response of the human body to external stimuli and in particular to a signal processing system for determining the one half relaxation time in Achilles tendon testing.

BACKGROUND OF THE INVENTION

Recent medical research has uncovered a strong correlation between thyroid disorders of the human body and abnormal Achilles tendon reflex reactions. This discovery has enabled thyroid condition testing in a manner far more rapid and less complex than the previously practiced clinical biochemical analysis.

The Achilles tendon reflex is normally measured by detecting the duration of foot motion in response to a tap on the Achilles tendon by a percussion hammer. Foot motion can be electrically detected from the output of a photodetector which receives a light beam that is variably occluded by induced foot motion. A display of the detector signal waveform on a strip recorder can then be manually measured with a ruler to determine the time between hammer tap and one half relaxation of the Achilles tendon. This system of measurement is unsatisfactory for several reasons including the time consumed in making the measurement from the chart, the inaccuracy of making a measurement manually from the chart, and the inaccuracy of the displayed waveform due to phase and time distortion inherent in electromechanical recorders.

A more satisfactory system is to provide processing electronics for the detector signal waveform to accurately and consistently detect the time interval between the hammer tap and the one half relaxation point. While systems are known which provide a digital indication representative of the elapsed time between specified points on a waveform, special problems exist in the field of Achilles tendon reflex testing that require imaginative nd novel solutions in order to provide an accurate measure of the half relaxation time. For example, even with an ideal normal patient it has been found that not every Achilles tendon reflex is representative of that patient's normal reflex. In particular, the first reflex reaction in any test is likely to be the result of initial muscle and nerve tension which disappears in later reflexes. Additionally, many patients do not exhibit a typical normal waveform from an Achilles tendon reflex, but instead create waveforms having varying amplitudes, or which are the result of additional spastic foot jerks. To be useful for semi-automated Achilles tendon reflex testing, a detector signal processor must automatically account for normal and abnormal patients and the corresponding waveform responses they generate during Achilles tendon testing.

BRIEF SUMMARY OF THE INVENTION

Illustrative of the invention, an Achilles tendon reflex testing system is provided to determine an accurate and representative elapsed time interval between hammer tap and one half muscle relaxation for the Achilles tendon reflex of normal as well as abnormal patients. The testing system provides the test operator with a visual display of an electrical waveform representing foot motion during tendon reflex and a digital indication of elapsed time between hammer tap and one half relaxation. Additionally, points of hammer tap and one half relaxation are marked on the displayed waveform. The test operator can thereby determine when, with the system properly operating, an accurately representative reflex for that patient has occurred and can accordingly cause the corresponding digital indication of elapsed time to be recorded for use by a central processing unit as that patient's characteristic Achilles tendon reflex time.

The normal detector waveform for Achilles tendon response comprises an initial relatively small lobe representative of momentum exchanged between the hammer and the foot and a subsequent relatively longer and larger lobe representative of tendon contraction and relaxation. Abnormal responses include those in which the relative amplitudes of the two lobes are more nearly the same or even in inverse relationship, and reactions where spastic foot jerking produces additional lobes in the detector signal waveform or where a motion is encountered directly after the initial two. Moreover, initial and terminal foot positions directly before and after a tendon reflex are subject to substantial variation.

Within the system according to the invention, electronics are provided to discriminate against detection of erroneous half relaxation times, when abnormal or unusual patient responses are encountered, to insure that the time interval is accurately a measurement of the time between hammer tap and an accurate, repeatably defined one half relaxation in the Achilles tendon muscle itself.

BRIEF DESCRIPTION OF THE DRAWINGS

A more complete understanding of the present invention will be obtained by reference to the following detailed description of a preferred embodiment, presented for purposes of illustration and not by way of limitation, and by reference to the accompanying drawings, in which:

FIG. 1 is a prior art schematic and top view of a photo-detector arrangement for detecting patient foot motion during Achilles tendon reflex testing;

FIGS. 2A-I are waveforms of various Achilles tendon reflex responses and waveforms at various points in the system useful in understanding operation of the invention;

FIG. 4 is a partial block and partial schematic diagram of a half relaxation point detector operative in the circuitry of FIG. 3.

DETAILED DESCRIPTION

Figure 3:
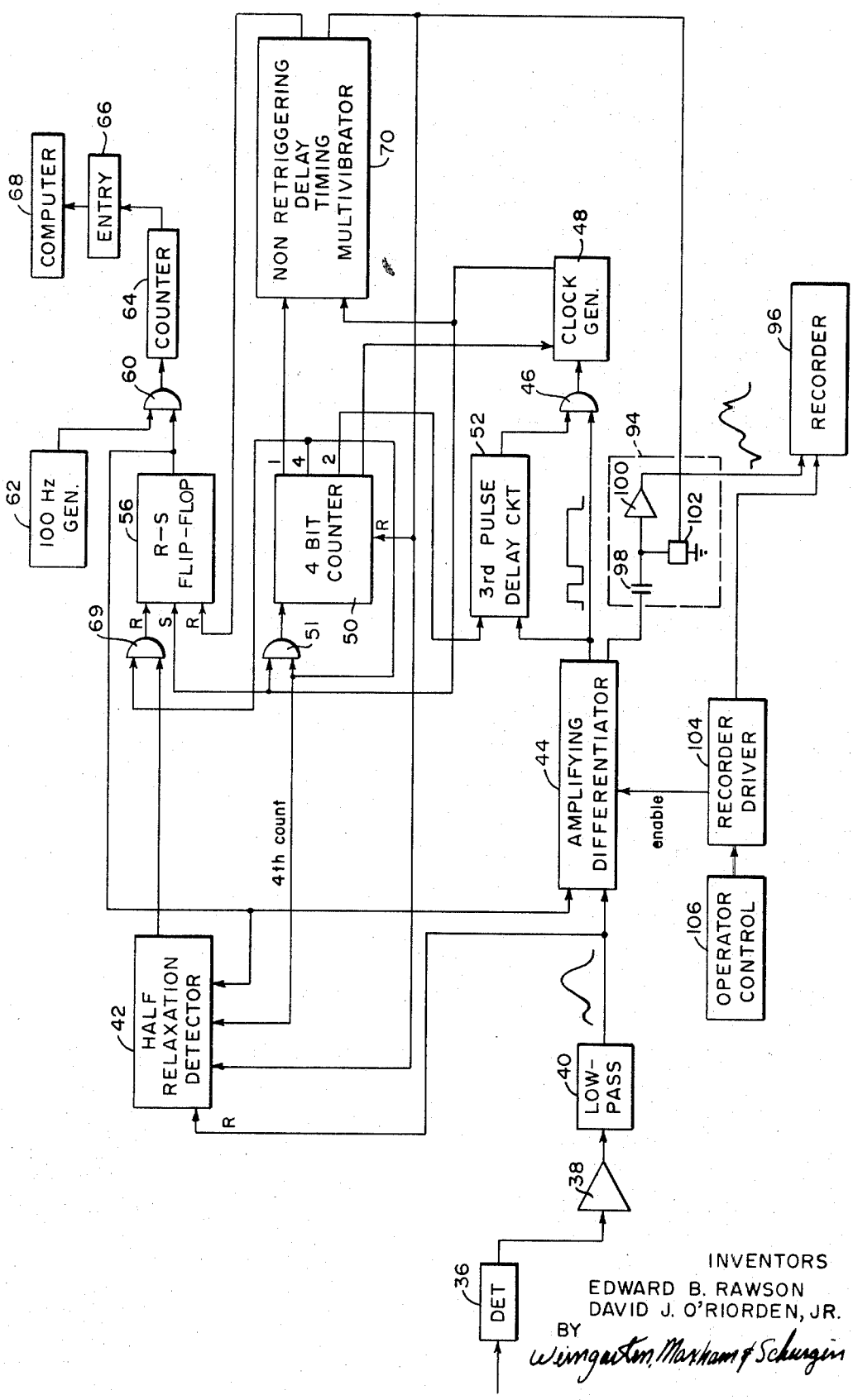
FIG. 3 is a block diagram of an Achilles tendon testing system according to the invention for processing the detector signals produced by foot motion.

Referring to FIG. 1 of the drawings, there is shown in top view the leg 12 of a patient supported by a stool 14 such that the foot 16 overhangs the stool 14 with the Achilles tendon region 18 facing upward for easy reflex testing by tapping with a percussion hammer. As prior art, a light source 20 provides a beam of illumination 22 onto an illumination detector 24 having collimator slits 26. The patient's foot 16 is placed to intercept the illumination 22 and to occlude a portion of the beam between the source 20 and detector 24. An exemplary prior art photodetection system using this principle is the model FM-1 Photomotograph, Burdick Corporation, Milton, Wis.

Striking the Achilles tendon 18 with a percussion hammer causes the foot 16 to jerk with a motion that varies the occluded portion of the illumination 22 and produces a corresponding electrical output from the detector 24, as indicated in FIG. 2A for the case of a normal Achilles reflex. The FIG. 2A waveform comprises a first occurring lobe 28 normally produced by momentum exchanged between the percussion hammer and the foot. A subsequent lobe 30 of significantly larger amplitude is the result of the Achilles tendon reflex and comprises a rising portion 30a of muscle contraction and falling portion 30b of muscle relaxation.

For purposes of identification, other portions of the curve of FIG. 2A can be identified and include the point 28a at the beginning of curve 28 where the hammer blow is first felt and the detector signal begins to rise to a peak level 28b from which it falls to a minimum 28c. From point 28c the induced muscle contraction from the hammer tap causes the rising portion 30a that reaches a peak contraction 30c from which muscle relaxation causes the falling portion 30b. A point 30d on the curve 30b is commonly referred to as the one half relaxation point and represents a level halfway between the level of points 28a and 30c.

In normal Achilles tendon reflex testing, the parameter of interest is the elapsed time between the occurrence of the point 28a and the occurrence of the point 30d. The point of half relaxation 30d is chosen to represent reflex duration because of the relative steepness of the detector curve at that point which minimizes the time error corresponding to amplitude error. The one half relaxation point is defined in terms of the initial level 28a and peak contraction level 30c because of uncertainty in signal level after complete relaxation.

While the response signal of FIG. 2A is the normal detector signal for the Achilles tendon reflex response of most persons, important variations in this normal curve are found among patients and must be adapted to by any system used to determine the one half relaxation time. In particular, FIG. 2B shows a detector signal in which momentum and contraction lobes of the response, 28' and 30' respectively, are of more equal amplitude, and, in fact, it is possible to have the momentum lobe 28' exceed in amplitude the contraction lobe 30'. In FIG. 2C a detector signal is shown wherein momentum and contraction lobes, 28'' and 30'' respectively, have normal amplitude levels but have additional spastic contraction lobes 32 occurring between them. In FIG. 2D a normal curve is again shown composed of momentum and contraction lobes 28''' and 30''' but having a trailing response lobe 34 directly following the relaxation portion of lobe curve 30'''. In the case of all the detector signals indicated by FIGS. 2A-2D, the point of one half relaxation is defined by the signal level midway between the initial and peak contraction signal levels and it is important to be able to measure the relaxation time in terms of those same signal levels.

Referring now to FIG. 3, this is accomplished by a novel Achilles tendon testing system adapted for measuring the interval between the hammer tap and one half relaxation of an Achilles tendon reflex. A detector 36 receives varying degrees of illumination corresponding to reflex motion of a patient's foot and provides a photoelectric detector output signal to an amplifier 38 which boosts the photoelectric signal level to a degree compatible with later processing electronics. A differential input is employed by the amplifier 38 to minimize common mode noise. A low-pass filter 40 receives the output signal of the amplifier 38 and is tuned to substantially reduce or eliminate 120 Hz variations in the amplified photoelectric signal attributable to ambient light in the Achilles tendon testing area. The low-pass filter 40 eliminates the potential for erroneous signal generation by other circuitry in the system in response to photodetection of ambient light in brightly lighted locations.

The output of the low-pass filter 40 is fed to both a half relaxation detector 42 and an amplifying differentiator 44. The amplifying differentiator 44 provides amplification and differentiation and produces, from a Schmitt trigger output stage, a two level output signal with the first level provided in response to a change in the slope of the filtered photoelectric signal from a zero to a positive slope, and with the second level provided by a change in the slope of the filtered photoelectric signal from a zero to a negative slope. A representative two level signal is indicated by FIG. 2E. The magnitude of the positive and the negative slopes necessary to produce switching of the two level output signal from the differentiator 44 is determined by the amplification of the differentiator 44 and hysterisis of the Schmitt trigger output stage, and is adjusted, insofar as possible, to exclude switching on unwanted signals and noise. The two level signal from the differentiator 44 is fed through a gate 46 to a clock generator 48 which outputs a pulse of a single polarity in response to each transition in the two level signal from the amplifying differentiator 44.

In the case of a normal photoelectric signal, such as that shown in FIG. 2A, the clock generator 48 will produce a sequence of four pulses corresponding to the points 28a, 28b, 28c, and 30c in FIG. 2A. The output from the amplifying differentiator 44 is shown in FIG. 2E, and the corresponding pulse output is shown in FIG. 2F as modified by circuitry described below.

The normal sequence of four pulses for an Archilles reflex provided by the clock generator 48 is fed to a four bit counter 50 through a gate 51 to provide one bit advances in the count thereof with each pulse. The counter 50 thus provides signals indicating which pulse in the normal sequence of four pulses has most recently occurred with this indication used for controlling other operations of the system.

In order to avoid the production of six, eight or more pulses for each Achilles reflex in the case of the spastic contractions of FIG. 2C, a third pulse delay circuit 52 is provided which receives from the counter 50 an indication of the occurrence of the second pulse corresponding to the point 28b in FIG. 2A. A timed interval is thereby initiated to provide an inhibit signal, shown in FIG. 2G, which is fed to the gate 46. This inhibit signal blocks passage of the third level transition from the amplifying differentiator 44 to the clock generator 48 for a predetermined delay. All further level shifts from the amplifying differentiator 44 reinitiate the delay interval of the circuit 52 while the delay interval is in progress. Once the predetermined delay interval has elapsed from the last transition, the two level output of the amplifying differentiator 44 is fed to the clock generator 48 to produce the corresponding third pulse in the four pulse sequence from the transition of the output of the gate 46, if the output of the differentiator 44 is in the first state, or when that output undergoes a transition to the first state. In this manner the third pulse delay circuit operates to discriminate between normal contraction signals 30 and substantially shorter spastic contractions 32 which are of a duration insufficient to maintain the output of the amplifying differentiator 44 in the one state for the length of delay interval of the delay circuit 52.

The pulse output of the clock generator 48 is also fed into a SET input of an R-S flip-flop to provide an enable signal at the output thereof. The output of the flip-flop 56 is fed to a gate 60 as a control for a 1 KHz pulse output from a generator 62, the 1 KHz signal being fed into the gate 60. The output of the gate 60 is fed to a displaying counter 64 with the digital count signal from the counter 64 fed through an entry command terminal 66 to a computer or data processor 68. The enable output from the flip-flop 56 allows 1.0 KHz rate pulses from the generator 62 to pass to the counter 64. Alternatively, sufficient accuracy is possible with a 100 Hz rate generator 62 instead of 1.0 KHz.

Resetting of the flip-flop 56 removes the enable signal from its output and is accomplished in several ways. Normally, resetting of the flip-flop 56 is achieved by a signal from the half relaxation detector 42 through a gate 69 upon detection of the one half relaxation point 30d in a normal Achilles response detector signal of the type shown in FIG. 2A or of corresponding points on the curves of FIGS. 2B–2D. The gate 69 receives the indication of the fourth pulse from the counter 50 and enables passage of the output of the relaxation detector 42 only after this fourth pulse so as to prevent resetting of the flip-flop 56 except along the signal portion 30b. A further reset for the flip-flop 56 is provided by a non-retriggering delay timing multivibrator 70 operating in a monostable mode. The multivibrator 70 is triggered on for a selected period of time by the first pulse in the four pulse sequence from the clock generator 48. This pulse is identified by a one state input to the multivibrator 70 from the counter 50. Upon detection of this first pulse the delay timing multivibrator 70 initiates a timing interval, as shown in FIG. 2H, which is long relative to the duration of the normal Achilles reflex reaction. The non-retriggering delay multivibrator 70 is triggered only once on the occurrence of the first pulse from the clock generator 48 is a normal four pulse sequence and its timing interval is not affected by subsequent pulses received by it. At the end of this period the multivibrator 70 outputs a signal to the flip-flop 56 to reset the flip-flop 56 if it has not already been reset by the half relaxation detector 42. A signal from the multivibrator 70 also resets the four bit counter 50 to a no pulse count after the timing interval.

The function of the multivibrator 70 further includes preventing the mistaken detection of a subsequent contraction signal 34, indicated in FIG. 2D, as an initial foot response portion 28. Since the normal Achilles reflex lasts substantially less than a second the timing interval of the delay timing multivibrator 70 can be set significantly longer than this interval and still be short enough to provide reset of the system before a subsequent hammer tap would be administered by the test operator in the normal test.

The structure and operation of the half relaxation detector 42 can best be understood by referring to FIG. 4. The output of the low-pass filter is fed into the detector 42 through a capacitor 72 and into the input of a unity voltage gain amplifier 74. The input of the amplifier 74 is selectively grounded through an electronic switch 76 controlled by the flip-flop 56 to provide normal grounding of the input of amplifier 74 until the occurrence of the first pulse in the normal four pulse sequence sets flip-flop 56 and causes switch 76 to open. The switch 76 is closed again when the flip-flop 56 is reset. When the switch 76 is open circuited, the amplifier 74 is permitted to respond to signals from the capacitor 72 representing changes in the input to relaxation detector 42 thereafter.

The output of the amplifier 74 is fed through a further capacitor 80 into the input of a unity gain amplifier 82. The input of the amplifier 82 is selectively grounded by a switch 84 controlled by the fourth pulse indication from the counter 50. After the end of the timing interval of the multivibrator 70, the counter 50 is reset and the switch 84 is placed in a condition to ground the input of the amplifier 82. After the counter 50 indicates the occurrence of the fourth pulse, the peak contraction 30c, the switch 84 is opened to allow the amplifier 82 to respond to the signal from the capacitor 80.

The output of the amplifiers 74 and 82 are conducted through respective resistors 88 and 90 to a noninverting input of a comparator 92. An inverting input of the comparator 92 is connected to circuit ground. The output from the comparator 92 provides a signal indicating the half relaxation point, which signal is conducted to the flip-flop 56 through gate 69.

In the operation of the circuitry of FIG. 4, the input capacitor 72 will charge up to the value of the detector signal prior to the occurrence of an Achilles tendon reflex signal. At the instant that the hammer tap is administered to the patient, the switch 76 is opened allowing the amplifier 74 to respond to the detector signal with the initial point 28a of the signal established as ground. The amplifier 74 will respond by outputting a signal which charges the capacitor 80 to the level of the amplified, and filtered, detector signal as it varies between the points 28a and 30c on the curve of FIG. 2A. When the point 30c is reached, the switch 84 is opened allowing the amplifier 82 to respond to the output of the amplifier 74 with an offset voltage provided by the capacitor 80. This offset is equal to the signal level difference between the points 28a and 30c. The outputs of the amplifiers 74 and 82 then differ by an amount equal to the signal level difference between the points 28a and 30c, irrespective of the value of the point 28b as in FIG. 2B. In order to identify the point in time when the photodetector signal, as amplified and filtered, has dropped by one half of this difference, the resistors 88 and 90 are chosen to be equal. The signal level at the junction between the resistors 88 and 90 will correspondingly be zero, or ground, at the point when the amplified and filtered detector signal has decreased by one half the difference between the initial and peak values, 28a and 30c respectively. At this point the comparator 92 provides a marking signal at its output which is operative to reset the flip-flop 56 and mark the time of occurrence for the amplifying differentiator 44. The gate 69 in FIG. 3 is provided to prevent below zero excursions of the photodetector signal between points 28a and 30c from resetting the flip-flop 56.

It is alternatively possible, by simply adjusting the relative values of the resistors 88 and 90, to vary the point on the relaxation curve at which the comparator 92 provides the signal. Preferably, the one half relaxation point is chosen for reasons indicated above.

Returning to FIG. 3, the remaining portion of the system circuitry can now be described and understood. The amplifying differentiator 44 receives an input from the output of the flip-flop 56 which identifies the initial point 28a of the reflex response and the one half relaxation point 30d as indicated in FIG. 2A. The amplifying differentiator 44 differentiates this signal from the flip-flop 56 to provide respective negative and positive pulses which are summed with the filtered signal from the low-pass filter 40 and outputted to a recorder amplifier 94. Recorder amplifier 94 applies them to the pen marking control of a recorder 96 to produce the composite waveform indicated in FIG. 2I. The recorder amplifier 94 comprises an input capacitor 98 which feeds into the input of an amplifier 100. The input of amplifier 100 is selectively grounded by a logical controller 102 on the basis of an input from the multivibrator 70. The logic controller 102 provides grounding of the input of amplifier 100 at all times except during the timing interval produced by multivibrator 70. The output of the amplifier 100 is consequently operative only during an Achilles tendon reflex signal with the signal commencing at the same D.C. level. This functioning avoids the problem of variations in the D.C. offset of the recorder trace attributable to varying initial placement of the patient's foot in the light path between source and detector. This avoids the awkward and difficult task of precisely placing the patient's foot if offsets in the recorder trace are to be avoided.

A recorder driver 104 provides initiation of recorder operation in response to an input signal from an operator control 106. This signal initiates operation and marking by the recorder 96 and provides an enable signal for the amplifying differentiator 44 a preselected time instant after recorder initiation to allow passage of normally blocked signals from the amplifying differentiator to the clock generator 48. The predetermined delay in the generation of the enable signal from the recorder driver 104 allows settling of start transients from the recorder 96 to prevent them from affecting operation of the system.

While operation of the circuit has been made clear above, it is important to here not the cooperation of the system functions with an operator performing the Achilles tendon testing on an actual patient. The operator has control over the system function through two points, these being the operator control 106 and the entry circuit 66. Once the patient's foot has been properly positioned to provide variation in the illumination 22, the operator initiates operation of the recorder and system through the operator control 106 and commences tapping on the Achilles tendon with a percussion hammer. The patient will in normal practice be somewhat tense for the first few taps and the resulting responses as viewed on the display of the recorder 96 will indicate this to the operator. After a number of reflexes, however, the operator will note from the trace on the recorder 96 that the Achilles tendon is beginning to respond naturally and consistently for the individual patient. After the operator sees a response on the recorder 96 which appears representative of the response for the patient, the operator can disable further circuit operation through the operator control 106 and then provide recording of the half relaxation time recorded in the displaying counter 64 into the computer 68 through operation of the entry circuit 66.

This particular cooperation between system and operator provides for a high degree of accuracy in the recording and entering of the one half relaxation interval into the computer or processor 68 where it can be made available as part of the patient's file or operated on by the computer in conjunction with other patient data. Of particular significance is the provision of both a visual, analog display at the recorder 96 and a digital time indication by the counter 64. By further providing the pulses marking the points 28a and 30d on the display of the recorder 96, the test operator is provided with the data for evaluating each Achilles tendon reflex response to determine whether both patient and system are operating satisfactorily and whether the patient's reflex is a representative one suitable for providing the one half relaxation data.

The above description of the Achilles tendon reflex testing system has been presented for purposes of illustration and accordingly those skilled in the art will fine alternatives and modifications to the system which are within the basic scope of the invention. It is therefore intended to define the scope of the invention only as indicated in the following claims.

What is claimed is:

1. In a system for testing the Achilles tendon reflex of a patient and operative with an Achilles tendon reflex motion sensor of the type having an optical path between a light source and a light detector with the optical path occluded by the foot of said patient to varying degrees corresponding to the reaction of said foot to induced reflexing of the Achilles tendon, said detector providing an output signal varying with the degree of occlusion produced by said foot, the improvement comprising apparatus for processing the varying detector signal including:

means for receiving said varying detector signal;
means for detecting first and second points on said varying detector signal and providing an indication of the time interval between said first and second points thereon;
said first point representing the commencement of an induced Achilles tendon reflex;
said second point being a predetermined decay in the portion of said varying detector signal corresponding to induced Achilles tendon reflex relaxation;
means for displaying said received, varying detector signal with an indication of said first and second points thereon.

2. In a system for testing the Achilles tendon reflex of a patient and operative with an Achilles tendon reflex motion sensor of the type having an optical path between a light source and a light detector with the optical path occluded by the foot of said patient to varying degrees corresponding to the reaction of said foot to induced reflexing of the Achilles tendon, said detector providing an output signal varying with the degree of occlusion produced by said foot, the improvement comprising apparatus for processing the varying detector signal including:

means for receiving said detector signal;
means for generating a marker signal in response to each change in said detector signal from a signal slope of substantially zero to a signal slope which is significantly non-zero, thereby to produce a sequence of four marker signals with each detected normal Achilles tendon reflex;

resettable means for counting said sequence of marker signals, the count thereof providing an indication of the position of each said marker signal in the sequence of marker signals;

means responsive to the level of the detector signal both prior to the occurrence of the first marker signal of said sequence and at the occurrence of the fourth marker signal of said sequence for providing a relaxation marker signal when said detector signal reaches a level intermediate said levels before the first and at the fourth marker signal;

controllable means for counting at a fixed rate in response to a start signal and for ceasing to count in response to a stop signal;

means for producing said start signal upon the occurrence of the first marker signal and for producing said stop signal upon the occurrence of said relaxation marker signal;

means for combining said detector signal with said first and said relaxation marker signals to provide a composite signal;

means for providing a visual display of said composite signal; and means operator actuable for identifying the count in said counting means as representing desired data for a patient Achilles tendon reflex response.

3. The apparatus of claim 2 further comprising:
a data processor means; and
means for conveying the count in said controllable counting means to said data processor means in response to an operator identification thereof.

4. The apparatus of claim 2 further comprising:
means for causing said visual display of said composite signal to commence at substantially the same point along the signal level axis of said display.

5. Apparatus of claim 2 further comprising a low-pass filter means filtering said detector signal to provide suppression of detector signals resulting from ambient room lighting.

6. The apparatus of claim 2 further comprising means for inhibiting the generation of a first marker signal for a predetermined interval after the generation of a prior first marker signal, said predetermined interval being significantly longer than the detector signal produced by all expected Achilles tendon reflexes, thereby to prevent said first marker signal from being generated in response to a foot motion directly subsequent to an Achilles tendon reflex.

7. The apparatus of claim 2 further comprising:
means for producing a predetermined delay in generation of the third marker signal after the corresponding slope change in said detector signal; and
means responsive to the running of said predetermined delay for reinitiating the running of said predetermined delay with each occurrence of a detector signal slope change from a zero to non-zero slope during the running of said predetermined delay.

8. The apparatus of claim 7 wherein said means for generating said marker signals includes means operative to produce one of said marker signals only in response to said slope change being from said zero slope to a non-zero slope of at least a predetermined slope magnitude.

9. The apparatus of claim 2 wherein said means for producing said relaxation marker signal comprises:
means for responding to changes in said detector signal to provide a change responsive signal;
a first amplifier means providing a first output signal;
controllable means having a first state which prevents passage of said change responsive signal to said first amplifier means and a second state which allows passage of said change responsive signal to said first amplifier means;
the first state of said controllable means providing conduction of the input of said first amplifier means to a reference level;
a second amplifier means producing a second output signal;
means for storing signals which is connected between the output of said first amplifier means and the input of said second amplifier means;
said signal storing means having means for providing first and second states, said first state providing storage of the signal between said output of said first amplifier means and said reference level and further providing connection of said input of said second amplifier means to said reference level and said second state providing conduction of said first output to said input of said second amplifier means offset by the signal stored by said storing means;
means for producing a signal with a level intermediate the level of said first and second outputs;
means for producing said relaxation marker signal in response to said intermediate signal level passing through said reference level with a predetermined slope polarity after said fourth marker signal;
said controllable means and said signal storing means being normally in said first states;
means for changing the state of said controllable means to said second state in response to the first marker signal; and
means for changing the state of said signal storing means to said second state in response to the fourth marker signal;
said signal storing means being thereby operative to store a signal representing the difference in detector signal level between the level prior to the first marker signal and the level at the fourth marker signal;
said intermediate signal being thereby caused to pass through said reference level at a corresponding intermediate level of said detector signal.

10. The apparatus of claim 9 wherein said intermediate signal is half-way between the detector signal levels prior to the first marker signal and at the fourth marker signal.

11. In a system for measuring the Achilles tendon reflex of a patient operative with an electro-optical detector providing a detector signal varying in accordance with the movement of a foot being tested across a light beam, the improvement comprising apparatus for processing the detector signal including:
means for amplifying said detector signal;
means for low-pass filtering said amplified signal to reduce ambient light interference;
means responsive to said filtered signal for providing a two state signal;
means for producing transitions between first and second states of said two state signal in response to each change in said filtered signal from a slope of substantially zero to a slope of at least a predetermined magnitude;

means for generating a pulse with each transition in said two state signal whereby the detector signal of a normal Achilles tendon reflex causes said pulse generating means to produce a sequence of four pulses;

means for indicating which pulse in said sequence of four has occurred most recently;

means responsive to said filtered detector signal and operable only after an indication of the fourth pulse in said sequence for providing a marker pulse upon the occurrence of a predetermined relaxation level of said filtered detector signal after said fourth pulse;

a circuit means having two states, the first of said two states being produced in response to the first generated pulse in said sequence of four pulses, and the second of said two states being produced in response to said marker pulse;

means for counting at a predetermined rate whenever said two state circuit is in said first state;

means responsive to said first pulse in said sequence of four pulses and said marker pulse to produce the second state in said two state circuit a predetermined detector signal interval after said marker pulse;

means responsive to said second pulse for providing a predetermined delay in the generation of said third pulse;

said predetermined delay being reinitiated during its running in response to each transition of said two state signal;

means for combining said filtered detector signal with said first pulse and said marker pulse to produce a composite signal;

means for producing a visual display of said composite signal;

a data processor means; and means for conveying the count in said counting means to said data processor means in response to a command.

12. A system for operator testing of the Achilles tendon reflex of a patient comprising:

an Achilles tendon reflex motion detector means providing an output signal varying with foot position;

means responsive to said varying detector signal for providing a first signal representing initial detector signal variation with foot motion;

means responsive to said varying detector signal for providing a second signal representing detector signal variation corresponding to Achilles tendon reflex relaxation;

means responsive to said first and second signals for providing indicia of the interval between said first and second signals;

means for displaying a signal representative of said varying detector signal; and operator actuated means for identifying indicia corresponding to a displayed detector signal thereby to mark acceptable indicia of Achilles tendon reflex response of a patient.

13. The system for testing the Achilles tendon reflex of a patient of claim 12 wherein:

means are provided for determining the second maximum excursion of said varying detector signal;

said means for providing said second signal includes means operative to provide said second signal in response to a predetermined reduction in said varying detector signal beyond the point thereof corresponding to said determined second maximum excursion in said varying detector signal; and said determining means includes means operative to discriminate against excursions of said varying detector signal corresponding to short, spastic foot reactions in determining said second maximum excursion.

14. The system for testing the Achilles tendon reflex of a patient of claim 12 including means for preventing the providing of said first signal from portions of said, varying detector signal corresponding to foot motions directly subsequent to said tendon relaxation.

* * * * *